United States Patent Office 3,766,085
Patented Oct. 16, 1973

3,766,085
USE OF N-ACYLAMINO ACIDS, THEIR SALTS AND ESTERS AS EMULSIFYING AGENTS, AND EMULSION SYSTEMS PREPARED THEREFROM
Rudolf Fahnenstich, Mombris, Joachim Heese, Grossauheim, and Gregor Schuster, New-Ulm, Germany, assignors to Deutsche Gold- und Silber-Scheideanstalt vormals Roessler, Frankfurt am Main, Germany
No Drawing. Filed Mar. 7, 1972, Ser. No. 232,627
Claims priority, application Germany, Mar. 10, 1971, P 21 11 361.1
Int. Cl. B01j 13/00
U.S. Cl. 252—309                        19 Claims

ABSTRACT OF THE DISCLOSURE

The use of an N-acylamino acid or ester or salt thereof as an emulsifier in the production of an oil-in-water or water-in-oil emulsion, which comprises mixing with an oil-in-water or water-in-oil composition a compound of the formula $$\text{H---N------CH---COOR}_3$$
$$\quad\ \ |\qquad\ \ \ |$$
$$\text{R}_1\text{---C=O}\ \ \text{R}_2$$

in which $R_1$ is a radical of a naturally occurring saturated or unsaturated fatty acid having about 2–22 carbon atoms, $R_2$ is a radical of a naturally occurring or chemically modified amino acid, and $R_3$ is hydrogen, a radical of a monohydroxy alcohol having about 1–4 carbon atoms, a radical of a polyhydric alcohol or a radical of a higher sugar alcohol. Water-in-oil and oil-in-water emulsion systems are also provided. The N-acylamino acids, esters and salts are particularly useful for preparing food stuffs and animal feeds.

---

This invention relates to N-acylamino acids, their salts and esters. More particularly, it relates to the use of these compounds as emulsifying agents in oil-in-water or water-in-oil emulsion systems.

Food stuffs and animal feed are generally prepared from naturally occurring substances. The characteristics, properties and quality of these substances is generally subject to continuous variation. Consequently, it is frequently difficult to process these subtsances using generally accepted methods. Therefore, in many cases it is frequently necessary to use "food additives" to obtain the desirable processing characteristics. It is also desirable that these additives enrich the nutritional value of the end product. It is necessary that these additives, however, be physiologically and toxicologically harmless, and also that they be compatible with other components in the food stuff or animal feed.

Among these "food additives" are emulsifiers or emulsifying agents which occupy a particularly broad area. The known emulsifying agents may exhibit sometimes effects other than their primary function. Such emulsifying agents have been used for a long time in the food stuff, animal feed, semi-luxury (e.g. cosmetic), etc., industries. The known emulsifying agents are frequently used to obtain a homogeneous distribution of edible fats and oils in water and aqueous mediums, or vice versa. For example, a typical oil-in-water emulsion exists in the form of milk, while a typical water-in-oil emulsion is margarine.

An emulsifier, also known as an emulsifying agent, is generally a substance used to make an emulsion more stable. Generally, these are chemical compounds which have a hydrophilic and a hydrophobic molecular component. Suitable compounds can be anionically, cationically or non-ionically active.

Most of the emulsifiers proposed and used heretofore consist of non-physiological substances, that is, substances which are, at most, only partially absorbed by the human or animal organism, and which contribute very little nutritional value to food stuffs and animal feeds treated with them.

The monoglycerides of higher fatty acids are well-known in the art for use as emulsifiers for food stuffs and animal feeds. While it is true that these fatty acids are physiological substances, their effectiveness is generally limited in oil-in-water emulsions.

Similarly, lecithin has been used as an emulsifying agent, but this substance exhibits a poor emulsifying effect, and, in addition, it is known to impede the production process of food stuffs and animals feed, for example, by clogging spray nozzles used to spray a fat-emulsifier mixture.

Stearyl lactylate and tartrate contain carboxylic acids as well as the fatty acid radical. The emulsifying effect of these compounds is not entirely satisfactory, and further, the carboxylic acids are generally of no nutritional value. Similar difficulties are encountered with the use of the sugar esters of higher fatty acids where again difficulties occur in processing.

Accordingly, this invention provides for the use of an N-acylamino acid or ester or salt thereof as an emulsifier in the production of an oil-in-water or water-in-oil emulsion. An oil-in-water or water-in-oil composition is mixed with a compound of the formula $$\text{H---N------CH---COOR}_3$$
$$\quad\ \ |\qquad\ \ \ |$$
$$\text{R}_1\text{---C=O}\ \ \text{R}_2$$

in which $R_1$ is a radical of a naturally occurring saturated or unsaturated fatty acid having about 2–22 carbon atoms, $R_2$ is a radical of a naturally occurring or chemically modified amino acid, and $R_3$ is hydrogen, a radical of a monohydroxy alcohol having about 1–4 carbon atoms, a radical of a polyhydric alcohol or a radical of a higher sugar alcohol.

This invention also provides an oil-in-water emulsion containing as an emulsifying agent about 0.1–20 percent by weight in relation to the weight of the oil of a compound of the formula $$\text{H---N------CH---COOR}_3$$
$$\quad\ \ |\qquad\ \ \ |$$
$$\text{R}_1\text{---C=O}\ \ \text{R}_2$$

in which $R_1$ is a radical of a naturally occurring saturated or unsaturated fatty acid having about 2–22 carbon atoms, $R_2$ is hydrogen, methyl, —$CH_2$—$CH_2$—S—$CH_3$,

—$CH_2$—$(CH_2)_3$—$NH_2$,

—$(CH_2)_3$—NH—C(NH)—$NH_2$, or

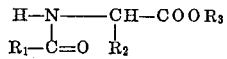

and $R_3$ is hydrogen, a radical of a monohydroxy alcohol having about 1–4 carbon atoms, —$CH_2$—$CH_2OH$, —$CH_2$—CH(OH)—$CH_2OH$, or a radical derived from erythritol, arabitol, xylitol, mannitol, sorbitol or dulcitol.

According to this invention, there is also provided a water-in-oil emulsion containing as an emulsifying agent about 0.1–20 percent by weight in relation to the weight of water of a compound of the formula $$\text{H---N------CH---COOR}_3$$
$$\quad\ \ |\qquad\ \ \ |$$
$$\text{R}_1\text{---C=O}\ \ \text{R}_2$$

in which $R_1$ is a radical of a naturally occuring saturated or unsaturated fatty acid having about 2–22 carbon atoms, $R_2$ is hydrogen, methyl, —$CH_2$—$CH_2$—S—$CH_3$,

—$CH_2$—$(CH_2)_3$—$NH_2$,

—$(CH_2)_3$—NH—C(NH)—$NH_2$, or

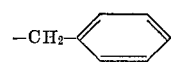

and $R_3$ is hydrogen, a radical of a monohydroxy alcohol having about 1–4 carbon atoms, —$CH_2$—$CH_2OH$,

—$CH_2$—$CH(OH)$—$CH_2OH$, or a radical derived from erythritol, arabitol, xylitol, mannitol, sorbitol or dulcitol.

In practicing this invention, an oil-in-water or water-in-oil composition is used as a starting material. To this is added the N-acylamino acid or ester or salt. As used herein, "an oil-in-water or water-in-oil composition" is one containing an oil and water as essential components. The starting material can also contain other components, such as vitamins, minerals and other nutrients, which do not materially detract from the basic and novel characteristics of the emulsion product. It will be recognized that the starting material can be either a naturally occurring substance, or a substance prepared from water and a selected oil. Those skilled in the art will recognize that the relative proportions of water and oil and characteristics of the oil used will determine whether the starting material and final product are termed a water-in-oil or oil-in-water composition or emulsion. Typical starting materials will be readily apparent from the discussion which follows hereinafter.

In the N-acylamino acids, esters, or salts having the formula listed above, $R_1$ signifies a radical of a naturally occurring saturated or unsaturated fatty acid having about 2–22 carbon atoms. Preferably, the fatty acid contains about 10–20 carbon atoms. A fatty acid containing about 12–18 carbon atoms is particularly preferred.

It will readily be apparent that the radical $R_1$ forms part of an acyl radical. Typical, the acyl radical can be derived from the following acids: acetic acid, propionic acid, butyric acid, isobutyric acid, valeric acid, caproic acid, enanthic acid, caprylic acid, pelargonic acid, capric acid, undecylic acid, lauric acid, tridecylic acid, myristic acid, pentadecylic acid, palmitic acid, margaric acid, stearic acid, nondecylic acid, arachic acid, eicosanic carboxylic acid —(1), behenic acid, oleic acid, crotonic acid, angelic acid, tiglic acid, cis-13-docosenoic acid, acrylic acid, elaidic acid, 12-docosenoic acid, geranic acid, 9,12-octadecadienoic acid, 9,12,15-octadecatrienoic acid or eleostearic acid. Other acids will be apparent to those skilled in the art.

In the N-acylamino acid, ester or salt having the aforementioned formula, $R_2$ signifies a radical of a naturally occurring amino acid, for example, hydrogen, methyl,

—$CH_3$—$CH_2$—S—$CH_3$, —$CH_2$—$(CH_2)_3$—$NH_2$,

—$(CH_2)_3$—NH—C(NH)—$NH_2$,

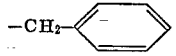

and similar ones. The amino acid can optionally be chemically modified.

The amino acid component of the compounds used in this invention can be derived from all naturally occurring, essential and nonessential, amino acids or their racemates. Examples are glycocoll, alanine, leucine, isoleucine, valine, proline, phenylalanine, aspartic acid, glutamic acid, serine, tyrosine, cystine, arginine, histidine, lysine, tryptophan and methionine. If the amino acid forming the base structure of the N-acylamino acid has more than one acylatable amino group, such as lysine or ornithine, the compounds that are to be used in this invention can have one or more by oxidation to a sulfoxide group or a sulfone group, or connected with a methyl halide to a methylsulfonium-halide group.

In the aforementioned formula, $R_3$ signifies hydrogen, a radical derived from a monohydroxy alcohol having amino groups in acylated form. If the amino acid forming the base structure has other functional groups besides the carboxyl and amino groups, these groups can be chemically modified prior to or after acylation. Thus, for example, the thioether bridge of methionine can be converted about 1–4 carbon atoms, or a polyhydroxy alcohol or a higher sugar alcohol. Typical of the polyhydroxy alcohols are glycol, glycerol, erythrol, arabitol, mannitol, and heptitol. Other polyhydric alcohols will be apparent to those skilled in the art. One or more of the free hydroxyl groups can be esterified with naturally occurring fatty acids. Thus, $R_3$ can be —$CH_2$—$CH(OH)$—$CH_2$—O—CO—$CH_3$, —$CH_2$—$CH(OH)$—$CH_2$—O—CO—$(CH_2)_{16}$—$CH_2$ or similar radicals.

The N-acylamino acids used in this invention can be used in a free form and in the form of salts of the alkali or alkaline earth metals, for example, sodium, potassium, magnesium or calcium. Salts of ammonia or of primary, secondary and tertiary amines can also be used. Typical are ethylamine, diethylamine, triethylamine, ethanolamine, diethanolamine and triethanolamine.

Finally, the amino acid component of the compounds used in this invention can also be esterified with monovalent alcohols, for example ethanol, propanol, isopropanol or a butanol, or with a multivalent alcohol, for example, glycerol, or a higher sugar alcohol, for example, erythritol, arabitol, xylitol, mannitol, sorbitol, or dulcitol. Further, the hydroxy groups derived from these multivalent alcohols can be esterified with the above described saturated or unsaturated fatty acids having 2 to 22, preferably 10 to 20, and especially 12 to 18 carbon atoms. Preferred are such compounds in which the amino acid component is esterified with one monoglyceride of a higher fatty acid, such as a fatty acid having about 10 to 20 carbon atoms.

The compounds used in this invention are typically used in quantities of about 0.1–20% by weight, preferably about 0.5–6% by weight, especially about 1–4% by weight, related to the oil portion in the production of an oil-n-water emulsion, or related to the water portion in the production of a water-in-oil emulsion. In the case of concurrent use of phosphatides, the amount of the phosphatide is about 0.5–10% by weight, preferably about 1–7% by weight, especially about 1.5–4% by weight. The phosphatides, also known as phospholipins and phospholipides are well-known in the art. Members of the general class of these compounds can be used. They are generally recognized as a group of lipid substances which occur in cellular structures and contain esters of phosphoric acid. Typical phosphatides are cephalin, lecithins, etc.

No protection is claimed in this application for the production of the described N-acylamino acids. The acids can conveniently be produced by the acylation of amino acids occurring in nature or their racemates. The amino acids can be chemically modified. They can be reacted with fatty acids occurring in nature or their mixtures. Typically, the N-acylamino acids can be prepared according to known procedures by the acylation of an amino acid with a fatty acid chloride or anhydride, and also by the possible esterification of the amino acid with the desired alcohol under the catalytic influence of acid or acid ion exchangers.

This invention will be more clearly understood by reference to the following examples. All parts, proportions, and percentages are by weight unless otherwise indicated.

EXAMPLE 1

(a) Production of stearoylmethionine 0.1 mole methionine is dissolved in 100–150 ml. water by addition of 10 ml. 20% NaOH. At the same time, 0.1 mole stearic acid chloride and 0.1 mole NaOH are added drop by drop at 25°–35° C. in such a way that the pH of the solution is between 8 and 9. After the addition is completed, it is allowed to continue to react for 30 minutes, and then the solution is acidified with 6 N HCl. Then the precipitated stearoylmethionine is suctioned off, washed with water until free of acid and dried.

The yield amounts to 98% of theory.

Elementary analysis.—Calculated (percent): C, 66.5; H, 10.9; N, 3.4; S, 7.7. Found (percent): C, 65.3; H, 10.8; N, 3.3; S, 7.2.

(b) Production of an oil-in-water emulsion as milk exchanger

A milk powder mixture consisting of:

46.8% skim milk powder (sprayed goods)
46.8% skim milk powder (rolled goods)
6.4% sweet whey powder is used.

The fat mixture consists of:

50% beef tallow
20% pork fat
20% coconut oil
10% soybean oil.

0.96 g. stearoylmethionine is dissolved or suspended at about 50° C. in 24 g. of the fat mixture. This mixture is ground with 96 g. milk powder mixture in a porcelain mortar. Then 500 g. of 45° C. tap water (18° d.h.) [1 German degree of hardness of water (i.e. d.h.)=10 mg. CaO/l.=17.86 mg. CaCO$_3$/l.=17.86 p.p.m. CaCO$_3$=1.25 English Clark's degree of hardness=1.786 French degree of hardness] are poured over the 60 g. of the mixture developed, and then mixed with an egg beater at 600 r.p.m. for one minute. Each time 100 g. of a milk exchanger are poured into a 100 ml. pot funnel. After 5, 15 and 30 minutes this is separated into four layers of 25 g. each. Then a determination of fat according to the Gerber method is made.

After 5 minutes 54.5%, after 15 minutes 73% and after 30 minutes 79% of the fat is found for each in the topmost layer.

EXAMPLE 2

Stearoylmethionine sulfoxide is examined in the same manner. 0.96 g. stearoylmethionine sulfoxide is used and 24 g. of the fat mixture of Example 1(b). After 5 minutes 69.5%, after 15 minutes 77.5% and after 30 minutes 84% of the fat is in the topmost layer.

EXAMPLE 3

Example 2 is repeated with the use of a combination of 1% lauroylmethionine and 3% lecithin, each based on the quantity of fat used.

After 5 minutes 50.5%, after 15 minutes 69.5% and after 30 minutes 77% of the fat is found in the topmost layer.

EXAMPLE 4

Example 2 is repeated with the use of a combination of 1% palmitoyl arginine and 3% lecithin based on the quantity of fat.

After 5 minutes 52.5%, after 15 minutes 60% and after 30 minutes 74.5% of the fat is found in the topmost layer.

EXAMPLE 5

Example 2 is repeated with the use of a combination of 1.5% α,ε-distearoyllysine and 2.5% lecithin, based on the quantity of fat.

After 5 minutes 55%, after 15 minutes 62% and after 30 minutes 72.5% of the fat found in the topmost layer.

EXAMPLE 6

Example 2 is repeated with the use of 4% oleoyl methionine based on the portion of fat.

After 5 minutes 64%, after 15 minutes 74% and after 30 minutes 76% of the fat is found in the topmost layer.

EXAMPLE 7

Example 2 is repeated using 2% oleoyl methionine and 4% lecithin.

40% after 5 minutes, 46% after 15 minutes and 48% after 30 minutes of the fat is in the topmost layer.

EXAMPLE 8

Example 2 is repeated using 1% stearoylmethionethyl ester and 3% lecithin.

After 5 minutes 40%, after 15 minutes 60% and after 30 minutes 65% of the fat is in the topmost layer.

EXAMPLE 9

Example 2 is repeated using 4% oleoyl methionine glycerin ester.

After 5 minutes 54%, after 15 minutes 69% and after 30 minutes 74% of the fat is in the topmost layer.

EXAMPLE 10

2% oleoyl methionine is used in the fat mixture according to Example 1(b). 200 g. of this mixture is worked into 444 g. skim milk concentrate with 45% dry substance at a temperature of 60° to 70° C. After homogenizing, it is spray dried, and the 50% skim milk fat concentrate obtained is adjusted to a 20% fat content by mixing in a skim milk powder. When dissolving this mixture in water, the following fat distribution results:

After 5 minutes 26%, after 15 minutes 28%, and after 30 minutes 32% is found in the topmost layer.

The N-acylamino acids described are used as emulsifiers especially in the production, processing and enrichment of foodstuffs and animal feeds. For example, they can be used in the production of milk exchangers for the feeding of calves, for emulsions of cod liver oil, for the production of soups and sauces as well as margarine, mayonnaise, cream and ice cream. They can also be used in the production of meat products and sausages, noodles, spaghetti, and maccaroni. They consist of nontoxic, physiologically compatible components which can be utilized by the human or animal organism, and thus have an additional nutritive value. Furthermore, they can also be used in other fields, for example, in pharmaceutical or cosmetic preparations. While they can be used as the sole emulsifier, they can also be mixed with phosphatides occurring in nature, especially lecithins.

The compounds used in this invention exhibit a very good emulsifying effect, and are generally superior to known emulsifiers in this respect. This finding was surprising since the compounds described herein would not at first glance seem suitable as emulsifiers because of their HLB values (hydrophilic/lipophilic balance).

What is claimed is:

1. The use of an N-acylamino acid or ester or salt thereof as an emulsifier in the production of an oil-in-water or water-in-oil emulsion, which comprises mixing with an oil-in-water or water-in-oil composition a compound of the formula $$\begin{array}{c} H-N-\!\!\!-CH-COOR_3 \\ | \quad\quad\quad | \\ R_1-C=O \quad R_2 \end{array}$$

in which $R_1$ is a radical of a naturally occurring saturated or unsaturated fatty acid having about 2–22 carbon atoms, $R_2$ is a radical of a naturally occurring or chemically modified amino acid, and $R_3$ is hydrogen, a radical of a monohydroxy alcohol having about 1–4 carbon atoms, a radical of a polyhydric alcohol or a radical of a higher sugar alcohol.

2. Use specified in claim 1 in which $R_1$ is a radical having about 10–20 carbon atoms, $R_2$ is hydrogen, methyl, $-CH_2-CH_2-S-CH_3$, $-CH_2-(CH_2)_3-NH_2$, $-(CH_2)_3-NH-C(NH)-NH_2$, or

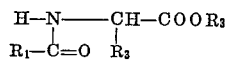

and the radical of the polyhydric alcohol is $-CH_2-CH_2OH$, or $-CH_2-CH(OH)-CH_2OH$.

3. Use specified in claim 2 in which $R_1$ is a radical having about 12–18 carbon atoms.

4. Use specified in claim 1 in which $$R_1-\overset{|}{C}=O$$

is derived from acetic acid, propionic acid, butyric acid, isobutyric acid, valeric acid, caproic acid, enanthic acid, caprylic acid, pelargonic acid, carpic acid, undecylic acid, lauric acid, tridecylic acid, myristic acid, pentadecylic acid, palmitic acid, margaric acid, stearic acid, nondecylic acid, arachic acid, eicosanic carboxylic acid-(1), behenic acid, oleic acid, crotonic acid, angelic acid, tiglic acid, cis-13-docosenoic acid, acrylic acid, elaidic acid, 12-docosenoic acid, geranic acid, 9,12-octadecadienoic acid, 9,12,15-octadecatrienoic acid or eleostearic acid.

5. Use specified in claim 4 in which $$H-\overset{|}{N}-\overset{|}{C}H-\overset{|}{R_2}$$

$COOR_3$ is derived from glycocoll, alanine, leucine, isoleucine, proline, phenylalanine, aspartic acid, glutamic acid, serine, tyrosine, cystine, arginine, histidine, lysine, tryptophan or methionine.

6. Use specified in claim 1 in which the alcohol is esterified with a monohydroxy alcohol, a polyhydroxy alcohol, a higher sugar alcohol, or a saturated or unsaturated naturally occurring fatty acid having about 2–22 carbon atoms.

7. Use specified in claim 6 in which the alcohol is ethanol, propanol, isopropanol, butanol, glycerin, erythritol, arabitol, xylitol, mannitol, sorbitol, or dulcitol, and the saturated or unsaturated fatty acid has about 10 to 20 carbon atoms.

8. Use specified in claim 7 in which the ester resulting from the esterification is

—$CH_2$—$CH(OH)$—$CH_2$—O—CO—$CH_3$ or —$CH_2$—$CH(OH)$—$CH_2$—O—CO—$(CH_2)_{16}$—$CH_3$.

9. Use specified in claim 1 in which the $$H-N-\overset{|}{C}H-COOR_3 \atop R_2$$

is esterified with a monoglyceride of a higher fatty acid.

10. Use specified in claim 1 in which the salt of the N-acylamino acid contains as a cation sodium, potassium, magnesium, calcium, ammonia, ethylamine, diethylamine, triethylamine, ethanolamine, diethanolamine or triethanolamine.

11. Use specified in claim 1 in which a phosphatide is used with the N-acylamino acid.

12. Use specified in claim 1 in which the N-acylamino acid is about 0.1–20 percent by weight in relation to the oil or water content of the emulsion.

13. Use specified in claim 1 in which the N-acylamino acid is about 0.5–6 percent by weight in relation to the oil or water content of the emulsion.

14. Use specified in claim 1 in which the N-acylamino acid is about 1–4 percent by weight in relation to the oil or water content of the emulsion.

15. Use specified in claim 11 in which the phosphatide is about 1.5–4 percent by weight in relation to the oil or water content of the emulsion.

16. Use specified in claim 11 in which the phosphatide is about 1–7 percent by weight in relation to the oil or water content in the emulsion.

17. Use specified in claim 11 in which the phosphatide is about 1.5–4 percent by weight in relation to the oil or water content of the emulsion.

18. An oil-in-water emulsion comprising oil, water, and as an emulsifying agent about 0.1–20 percent by weight in relation to the oil content of a compound of the formula $$H-N-CH-COOR_3 \atop R_1-\overset{|}{C}=O \quad R_2$$

in which $R_1$ is a radical of a naturally occurring saturated or unsaturated fatty acid having about 2–22 carbon atoms, $R_2$ is hydrogen, methyl, —$CH_2$—$CH_2$—S—$CH_3$,

—$CH_2$—$(CH_2)_3$—$NH_2$,

—$(CH_2)_3$—NH—C(NH)—$NH_2$, or

—$CH_2$—⟨phenyl⟩ and $R_3$ is hydrogen, a radical of a monohydroxy alcohol having about 1–4 carbon atoms, —$CH_2$—$CH_2OH$, —$CH_2$—$CH(OH)$—$CH_2OH$, or a radical derived from erythritol, arabitol, xylitol, mannitol, sorbitol or dulcitol.

19. A water-in-oil emulsion comprising water, oil and emulsifying agent about 0.1–20 percent by weight in relation to the water content of a compound of the formula $$H-N-CH-COOR_3 \atop R_1-\overset{|}{C}=O \quad R_2$$

in which $R_1$ is a radical of a naturally occurring saturated or unsaturated fatty acid having about 2–22 carbon atoms, $R_2$ is hydrogen, methyl —$CH_2$—$CH_2$—S—$CH_3$,

—$CH_2$—$(CH_2)_3$—$NH_2$,

—$(CH_2)_3$—NH—C(NH)—$NH_2$, or

—$CH_2$—⟨phenyl⟩ and $R_3$ is hydrogen, a radical of a monohydroxy alcohol having about 1–4 carbon atoms,

—$CH_2$—$CH_2OH$,

—$CH_2$—$CH(OH)$—$CH_2OH$, or a radical derived from erythritol, arabitol, xylitol, mannitol, sorbitol or dulcitol.

References Cited
UNITED STATES PATENTS 2,500,122   3/1950   Dixon et al. _____ 252—312

JOHN D. WELSH, Primary Examiner

U.S. Cl. X.R.

252—312, 357; 99—118 R, 123